(12) United States Patent
Sørensen et al.

(10) Patent No.: US 11,396,865 B2
(45) Date of Patent: Jul. 26, 2022

(54) WIND TURBINE GENERATOR WITH AN ELECTRIC GENERATOR BEARING ASSEMBLY

(71) Applicant: Vestas Wind Systems A/S, Aarhus N. (DK)

(72) Inventors: Kim Sveinsson Sørensen, Ry (DK); Flemming Væversted Jørgensen, Svenstrup J (DK); Olaf Brinckmann, Utecht (DE)

(73) Assignee: Vestas Wind Systems A/S, Aarhus N (DK)

( * ) Notice: Subject to any disclaimer, the term of this patent is extended or adjusted under 35 U.S.C. 154(b) by 597 days.

(21) Appl. No.: 16/301,456

(22) PCT Filed: Jun. 14, 2017

(86) PCT No.: PCT/DK2017/050197
§ 371 (c)(1),
(2) Date: Nov. 14, 2018

(87) PCT Pub. No.: WO2018/006913
PCT Pub. Date: Jan. 11, 2018

(65) Prior Publication Data
US 2019/0301435 A1      Oct. 3, 2019

(30) Foreign Application Priority Data
Jul. 5, 2016   (DK) .................. PA 2016 70494

(51) Int. Cl.
*F03D 80/70* (2016.01)
*F03D 9/25* (2016.01)
(Continued)

(52) U.S. Cl.
CPC ............... *F03D 80/70* (2016.05); *F03D 9/25* (2016.05); *F16C 33/6622* (2013.01);
(Continued)

(58) Field of Classification Search
CPC ........ F03D 80/70; F03D 9/25; F16C 33/6629; F05B 2240/54; F05B 2260/98; H02K 5/1732; H02K 7/083; H02K 7/1838
See application file for complete search history.

(56) References Cited

U.S. PATENT DOCUMENTS 2,278,663 A    4/1942  Loeffler
2,447,671 A *  8/1948  Schuck ................. F16C 35/042
                                                    384/468
(Continued)

FOREIGN PATENT DOCUMENTS

CN         104838157 A       8/2015
DE     202008002849 U1 *    5/2008  ............. F03D 80/00
(Continued)

OTHER PUBLICATIONS

Translation of DE-202008002849-U1 (Year: 2008).*
(Continued)

*Primary Examiner* — Sean Gugger
(74) *Attorney, Agent, or Firm* — Wood Herron & Evans LLP

(57) ABSTRACT

The present invention relates to wind turbine generator (WTG) with a ball bearing (31) supporting a rotating shaft. A suction provider (35), e.g. a rotating disc, is provided next to the ball bearing. An opposite grease reservoir (41) supplies the ball bearing with grease during rotational operation, the grease reservoir further having a shape so that a point (43) of the at least one grease reservoir being closest to the rotating shaft and a grease inlet of the ball bearing are adjoining. The suction provider creates a pressure which is slightly lower than atmospheric pressure, thereby creating a suction of grease (47) through the ball bearing from the grease reservoir, which aids in distributing the grease in the ball bearing. The invention provides an improved ball bearing having an extended lifetime of up to e.g. 7-10 years.

16 Claims, 8 Drawing Sheets

(51) Int. Cl.
*F16C 33/66* (2006.01)
*H02K 5/15* (2006.01)
*H02K 5/173* (2006.01)
*H02K 7/08* (2006.01)
*H02K 7/18* (2006.01)
*F16C 19/06* (2006.01)

(52) U.S. Cl.
CPC .......... *F16C 33/6629* (2013.01); *H02K 5/15* (2013.01); *H02K 5/1732* (2013.01); *H02K 7/083* (2013.01); *H02K 7/1838* (2013.01); *F05B 2240/54* (2013.01); *F05B 2260/98* (2013.01); *F16C 19/06* (2013.01); *F16C 2360/23* (2013.01); *Y02E 10/72* (2013.01)

(56) References Cited

U.S. PATENT DOCUMENTS

| | | | |
|---|---|---|---|
| 3,457,871 A | 7/1969 | Herger | |
| 4,541,784 A | 9/1985 | Hoerler | |
| 5,150,975 A * | 9/1992 | Major | F16C 33/664 384/465 |
| 2007/0068736 A1* | 3/2007 | Lajiness | F16N 7/363 184/6.16 |

FOREIGN PATENT DOCUMENTS

| | | |
|---|---|---|
| DE | 202008002849 U1 | 5/2008 |
| DE | 102009048767 A1 | 4/2011 |
| EP | 1801415 A2 | 6/2007 |
| EP | 2570663 A2 | 3/2013 |
| EP | 2826997 A1 | 1/2015 |

OTHER PUBLICATIONS

China National Intellectual Property Administration, First Notification of Office Action in CN Application No. 201780041681 8, dated Dec. 3, 2019.

European Patent Office, International Search Report and Written Opinion in PCT Application No. PCT/DK2017/050197, dated Sep. 7, 2017.

Danish Patent and Trademark Office, Search and Examination Report in PA 2016 70494, dated Jan. 30, 2017.

N. Goudarzi et al., A review of the development of wind turbine generators across the world, Int. J. Dynam Control (2013)1:192-202.

* cited by examiner

Prior art

New

WIND TURBINE GENERATOR WITH AN ELECTRIC GENERATOR BEARING ASSEMBLY

FIELD OF THE INVENTION

The present invention relates to a wind turbine generator with an electric generator bearing assembly. The invention further relates to an electric machine assembly and a corresponding method for lubricating an electric machine.

BACKGROUND OF THE INVENTION

Wind power as a source of green and abundant energy is often suggested as one of the most promising power sources and has acquired a great momentum across the world. In the last few decades, wind turbines with different generators have been developed to increase the maximum power capture, minimize the cost, and expand the use of the wind turbines in both onshore and offshore applications, cf. a recent review by N. Goudarzi and W. D. Zhu in *Int. J. Dynam. Control* (2013) 1:192-202.

Wind turbines, or wind turbine generators (WTGs), have over the past decades therefore experienced an increasing importance in electrical power production, and this growth of power generated from WTGs is expected to continue due to the world-wide transition from fossil fuel, i.e. coal, oil, and gas, to more climate-neutral electricity production.

A wind turbine converts wind power into electrical energy through an electric generator driven by the blades of the wind turbine under windy conditions. The mechanical energy is accordingly transferred to the electric generator via a rotating shaft, typically after a gearing mechanism so that the rotating shaft has a relatively high rotational speed in the electric generator. The high-speed rotating shaft is therefore critical dependent on appropriate support while enabling unrestricted rotating, typically in a suitable bearing. The operation of the bearing, in particular the maintenance of the bearing is therefore important. However, due to the typically remote position of wind turbine generators, e.g. in an off-shore wind turbine park, the frequency of service is relatively lower than for other type of bearings emphasizing the importance of reliable bearings for wind turbine generators.

In order to ensure that rolling bearings are operationally reliable and realise their full service life potential, it is critical to ensure that they are correctly lubricated. The lubrication ensures that rolling contact surfaces are separated and, thus, prevents metal-to-metal contact. Different types of lubrication exists, including oil and grease. Grease is often used as a lubricant e.g. in electric motors, as it has a number of advantages over oil, such as allowing simpler and more cost-effective housing and sealing designs.

Bearings requiring relubrication are often equipped with a grease escape valve. Excess grease is collected by a rotating disc, discharged into a cavity in the end-cover by centrifugal force and ejected through an opening on the underside of the cover. The rotating disc is a flat round piece of metal positioned around the rotating shaft next to the bearing, with a straight, orthogonally sided gap being present between the rotating disc and the bearing.

It is well-known in the field of generators and motors that lubrication-related failure is a main reason for premature failure of bearings, leading to shortened life of the bearings and often need for performing unplanned service on the generator or motor. Some experts estimate that as many as 60 to 80 percent of all bearing failures are lubrication-related, and fewer than 10 percent of all bearings under real-life operation actually reach their estimated lifetime. The lubrication-related failures may turn up as a consequence of e.g. lubrication build-up in the bearing or temperature differences/high temperatures within the bearing.

Hence, an improved wind turbine generator with an electric generator bearing assembly would be advantageous, and in particular a more efficient and/or reliable wind turbine generator with an electric generator bearing assembly would be advantageous.

It may be seen as an object of the present invention to provide an electric generator bearing assembly that solves the above mentioned problems of the prior art with bearing assembly in wind turbine generators.

SUMMARY OF THE INVENTION

Thus, the above described object and several other objects are intended to be obtained in a first aspect of the invention by providing a wind turbine generator (WTG) comprising an electric generator and a rotating shaft transmitting rotational movement to the electric generator, the electrical generator comprising an electric generator bearing assembly being grease lubricated, the electric generator bearing assembly comprising:

a ball bearing supporting the rotating shaft, the ball bearing having a rotating portion on the rotating shaft, and a fixed portion, the rotating portion and the fixed portion being separated by bearing balls, and a suction provider, wherein the fixed portion of the ball bearing comprises at least one grease reservoir adjacent to the bearing balls for supplying the ball bearing with grease during rotational operation, the at least one grease reservoir being positioned on a first side of the ball bearing, the at least one grease reservoir being rechargeable from a lubrication system, the at least one grease reservoir further having a shape so that a point of the at least one grease reservoir being closest to the rotating shaft and a grease inlet of the ball bearing are adjoining, and wherein the suction provider is positioned on a second side of the ball bearing, said second side being opposite the said first side of the ball bearing, and wherein the suction provider, during rotation of the rotating shaft, creates a pressure which is lower than atmospheric pressure, so as to create a suction of grease through the ball bearing from the at least one grease reservoir, which aids in distributing the grease in the ball bearing.

The invention is particularly, but not exclusively, advantageous for providing a wind turbine generator with an improved bearing, which is not as prone to premature failure as other bearings. In particular, the present invention is advantageous for providing a bearing, which has an extended lifetime of up to e.g. 7-10 years as estimated by accelerated life time test (heavy duty cycle test) performed by the applicant, or even more than 10 years, thereby reducing the need for exchanging the bearing.

It is additionally desirable to provide a bearing, which experiences more stable temperatures during operation, and a bearing, which has a minimized temperature difference between an inner race and an outer race to avoid the occurrence of a negative clearance in the start-up phase. Thereby, the present invention also provides a stabile temperature behavior in start-up phase and/or steady state phase, and furthermore ensure that the temperature of the bearings are kept stable in each end of the generator, i.e. both drive end (DE) and non-drive end (NDE), and not shifting the temperature behaviors.

Furthermore, the invention is advantageous for providing a bearing, which enables a more controlled flow of grease or lubricant to avoid the occurrence of "old" grease or lubricant in the bearing, and to ensure that grease does not build up inside the bearing and cause high temperatures and grease leaks in undesirable places. Within grease lubrication, it is known that when the active lubricant components embedded in the grease is used, cf. definition of grease further below, the grease has a limited lubrication efficiency and should be removed to allow for new grease to enter the bearing.

It has further been realised by the inventors of the present invention that in order to prevent high temperature differences in the ball bearing, it is advantageous to create a stable, controlled suction of the grease through the bearing to ensure that the grease is evenly distributed, preferably at a controlled steady pace, in the inner and/or outer race of the ball bearing and/or prevent build-up of grease or the grease escaping the ball bearing prematurely.

The invention is also advantageous for providing a ball bearing assembly, which is designed for automatic lubrication to minimise the need for service of the bearing and/or electrical machines, i.e. generators and/or motors. Moreover, it is advantageous for providing a bearing, which minimizes the bearing journal damage.

The at least one grease reservoir could be in form of one, or more, reservoirs for grease, e.g. it could be a single recesses or cavity providing grease to the ball bearing at a constricted point in the ball bearing, or it could a more extended grease reservoir around a part of the periphery of the ball bearing, optionally around the entire periphery of the ball bearing. In some embodiments, there are 2, 3, or 4 or more distinct grease reservoirs positioned around the periphery of the ball bearing, optionally positioned in symmetrical positions i.e. equidistantly around the periphery.

The grease reservoir is connected to a lubrication system for supplying grease to the grease reservoir, and subsequently from the grease reservoir into the ball bearing where the grease, in particular the active lubricant within the grease, is used for lubrication. The connected lubrication system can resupply the grease reservoir as it is known from previous automated lubrication systems for grease. However, the present invention enables the lubrication system to resupply the grease reservoir with longer intervals due to the more efficient use of grease, e.g. in tests performed by the applicant up to 5-10 times longer intervals between refilling of the grease reservoir were a significant benefit of the invention. It is also observed in tests performed by the applicant that a more limited amount of grease is needed because of the more efficient use, i.e. the grease reservoir can generally have a smaller volume as compared to previous grease reservoirs in ball bearing assemblies.

The suction provider within the context of the present can be implemented in various embodiments as it will be explained in more details below, but the overall function of the suction provider is to generate or create a suction of grease through the ball bearing from the at least one grease reservoir, which aids in distributing the grease in the ball bearing. Thus, normally a pressure below atmospheric pressure will be sufficient to provide an aid for distributing the grease in the ball bearing. It should be noted that in some embodiments, e.g. in connection with the suction provider comprising a rotating disc, the suction provider may provide both a suction and other techniques for the purpose of distributing the grease in the ball bearing, e.g. centrifugal forces.

Within the context of the present invention, the grease reservoir has a shape so that a point of the at least one grease reservoir being closest to the rotating shaft and a grease inlet of the ball bearing are adjoining, or immediately adjacent to each other, so that the grease can be supplied from around the closest point in the grease reservoir to the rotating shaft more or less directly into the ball bearing via a grease inlet, particularly without creating any dead spaces where the grease can accumulate in a disadvantageous way, because it cannot effectively enter into the ball bearing. Tests performed by the applicant with previous designs of the grease reservoir suggest that such undesirable accumulation of grease in the grease reservoir can result in critical failures of the ball bearing.

In some embodiments, the shape of the at least one grease reservoir may be designed to have a width, which is narrowing towards the grease inlet, so as to give, at least part of, the grease reservoir a substantially tapering shape. The width may preferably have a tapering shape in a cross-sectional view perpendicular to the rotating shaft, but additionally or alternatively, the tapering shape may also be present in other cross-sectional views. This has the advantage that the grease may be more efficiently conveyed, or distributed, into the ball bearing. Additionally or alternatively, at least part of, the grease reservoir may have a curved shape towards the grease inlet, preferably the curved shape being substantially aligned with a curvature of an inner race in the ball bearing, which has the advantage that the grease may be even more efficiently conveyed or distributed into the ball bearing.

In some advantageous embodiments, the suction provider may be configured to aid in distributing the grease in the ball bearing, resulting in that a temperature difference between an inner race of the ball bearing and an outer race of the ball bearing being less than approximately 20° C., preferably less than approximately 10° C., or more preferably less than approximately 5° C., upon rotation of the rotating shaft. As mentioned above, this temperature difference is considered to be related to critical failure modes of ball bearings, particular in wind turbine generators, due to the different thermal expansion around the ball bearing and/or accelerated degeneration of the grease in the ball bearing under elevated temperatures.

In other advantageous embodiments, the suction provider, upon rotation of the rotating shaft, may create a pressure approximately 0.03-0.3 bar, preferably 0.05-0.2 bar, lower than atmospheric pressure, as measured in tests performed by the applicant. The pressure was measured inside the generator during continuous operation, and it is assumed to be related to the bearing assembly according to the present invention.

In some embodiments, the suction provider providing the lower pressure may aid in distributing grease evenly in an inner race of the ball bearing, so as to prevent grease from building up at one or more points in the inner race. This has been confirmed by tests performed by the applicant, where parts of the ball bearing assembly were manufactured for test purposes in transparent materials in order to follow the distribution of the grease during start-up and during steady state operation of the generator with a bearing assembly according to the present invention.

In some particular advantageous embodiments, the suction provider may be a rotating disc, the rotating disc forming a grease escape valve by having a narrow gap with an opposing part of the fixed portion of the ball bearing, and wherein the rotating disc, upon rotation of the rotating shaft, provides said pressure which is lower than atmospheric pressure. It may be mentioned that such grease escape valves are known to work by having also centrifugal forces aiding in distributing, particularly removing, grease in connection with ball bearing assemblies. Preferably, the narrow gap may have an angle of inclination into the ball bearing, relative to a longitudinal direction of the rotating shaft, being between orthogonal and parallel. In some embodiments, the narrow gap may comprise opposing substantially plane surfaces, though it is also contemplated that a certain roughness or texture may be advantageous. In particular, a maximum level of roughness may be advantageously implemented. Additionally, for manufacturing and/or assembling purposes, the narrow gap may also have steps and joining parts etc. but effectively defining a narrow gap with respect to the suction provided for aiding in distributing the grease through the ball bearing. Preferably, the angle of inclination of the narrow gap with respect to a direction orthogonal to the longitudinal direction of the rotating shaft may be approximately 5-30 degrees, preferably approximately 10-25 degrees, tests showing these angles of inclination being particularly advantageous as it will be demonstrated below.

In some advantageous embodiments, the rotating disc may have a plurality of guides, such as indentations and/or protrusions, on a front side arranged to face the ball bearing, said guides extending in a radial direction of the rotating disc, either purely radial or possibly with a curved shape, e.g. a fan-like curvature, so as to aid in distributing grease in the ball bearing upon rotation of the rotating shaft. Particular, it should be noted that the rotating disc may be adapted to various kinds of grease used in the ball bearing by correspondingly modifying such guides on the rotating disc.

In some advantageous embodiments, the narrow gap, defined by the rotating disc and the opposing part of said fixed portion, may have a length which is substantially equal to, or larger than, half the diameter of the balls in the bearing, i.e. half of the so-called bearing pitch diameter of the bearing ball.

In some advantageous embodiments, the suction provider may alternatively be a pump, said pump being arranged to create a suction of grease during rotation of the rotating shaft. In some advantageous embodiments, the suction provider may comprise vacuum means and a connected hose arranged to create a suction of grease through the ball bearing. Thus, various pumps are considered beneficial for implementing a suction providing according to the present invention, e.g. positive displacement pumps i.e. reciprocating or rotary pumps, for example various fluid centrifugal pumps with impellers. Generally, the pumps may be mechanically connected to the rotating shaft, e.g. via gears, to provide driving means of the pumps making separate powering of such pumps superfluous. In one embodiment, the pump may be a pump comprising a rotating, perforated membrane, the perforations and the rotation in combination providing a controllable suction. Without any limitations, for the embodiments where the suction provider may be a rotating disc, the rotating disc may, at least to some extent, be considered a velocity pump where kinetic energy is added to the grease in a controlled way.

In some embodiments, a receiving chamber for the grease may be positioned on the second side of the bearing, i.e. on the same side of the ball bearing as the suction provider, the receiving chamber being connected to an inlet part of the narrow gap, where the grease is initially conducted into the narrow gap, the grease being conducted through the narrow gap to an outlet part of the narrow gap during rotation of the rotating shaft. Preferably, the inlet part of the narrow gap may have a smaller distance between the rotating disc and the opposing fixed part than the distance between the rotating disc and the opposing fixed part at the outlet part of the narrow gap, whereby the suction providing by a such a tapering shape of the narrow gap may facilitate improved suction.

Some Definitions

Repairing and Lubricating

The act of 'repairing' in the context of the present invention is to be interpreted as including, but not limited to, restoring by replacing part(s) with other part(s) to bring the electric generator into a functioning state. It need not be in an initial state of malfunctioning in order to be repaired, but could be an improved operation by implementing the method of lubricating according to the present invention i.e. a particular kind of repair, where e.g. an existing bearing assembly is repaired or modified to implement the present invention. The act of repairing could be interchangeably used with, or synonymously to updating, upgrading, performing maintenance, performing service, etc.

Wind Turbine Generator (WTG)

In the context of the present invention, the term "wind turbine generator", or sometimes just "wind turbine" for short, should be considered to include a wind turbine generator (WTG) comprising one or more (rotor) blades which are rotatable, by action of the wind, around a horizontal axis mounted in a nacelle mounted on the uppermost part of an elongated tower. The nacelle itself is pivotal around a vertical axis in order to turn the rotor blade into a suitable aligned position with the wind direction. The one or more rotor blades is rotated at a speed which is depending on the wind and the aerodynamics of the rotor blades in order to drive an electric generator for converting wind energy into electric energy. In short, a wind turbine or wind turbine generator or wind generator or aerogenerator may be defined as a means for converting the kinetic energy of the wind into mechanical energy and, subsequently, into electric energy.

Electric Machines; Generators and Motors

Electrical machines can generally be either generators or motors. Motors convert electrical energy into kinetic energy, whereas an electric generator converts kinetic energy into electric energy. Various generators are available depending on the speed range, placement, cost, weight, size and power quality at the grid connection. Normally, electric generators are classified according to the principle of operation, possibly also the power level. Generally, AC machines, universal machines and DC machine are overall available mode of operation, but within the WTG industry primarily AC machines, preferably the poly-phase type, i.e. with multiple phases, are widely used. The present invention is particularly, but not exclusively, relevant for wound rotor induction generators, more particularly doubly fed induction generator (DFIG).

Grease

Grease is generally understood to be a solid to semi-fluid product or dispersion of a thickening agent in a liquid lubricant. Additionally special ingredients causing special properties may be added. Cf. *Grease Lubrication in Rolling Bearings* by Piet M. Lugt, John Wiley & Sons (2012), or other similar references.

Some of the tests performed by the applicant in connection with the present invention were performed using so-called high-temperature and long-term greases for rolling bearings, particularly suited for WTG applications. The properties are longer service life due to wear additives, comparatively less maintenance, wide operating temperature interval, and optimized oil release from the grease. One example of such a grease may be Kluberplex® BEM 41-132, but the teaching of the present invention is not limited to any particular kind of grease for ball bearings, though various kind of grease may require minor modifications of the ball bearing assembly for optimum performance, such modifications being readily within reach of the skilled person once the teaching and principle of the present invention is comprehended.

In a second aspect, the present invention relates to an electric machine assembly comprising an electric machine and a rotating shaft transmitting rotational movement to, or from, the electric machine, the electrical machine comprising an electric machine bearing assembly being grease lubricated, the electric machine bearing assembly comprising:

a ball bearing supporting the rotating shaft, the ball bearing having a rotating portion on the rotating shaft, and a fixed portion, the rotating portion and the fixed portion being separated by bearing balls, and a suction provider, wherein the fixed portion of the ball bearing comprises at least one grease reservoir adjacent to the bearing balls for supplying the ball bearing with grease during rotational operation, the at least one grease reservoir being positioned on a first side of the ball bearing, the at least one grease reservoir being rechargeable from a lubrication system, the at least one grease reservoir further having a shape so that a point of the at least one grease reservoir being closest to the rotating shaft and a grease inlet of the ball bearing are adjoining, and wherein the suction provider is positioned on a second side of the ball bearing, said second side being opposite the said first side of the ball bearing, and wherein the suction provider, during rotation of the rotating shaft, creates a pressure which is lower than atmospheric pressure, so as to create a suction of grease through the ball bearing from the at least one grease reservoir, which aids in distributing the grease in the ball bearing.

In a third aspect, the present invention relates to a method of providing grease lubrication of an electric machine bearing assembly, the electric machine bearing assembly comprising:

a ball bearing supporting a rotating shaft, the ball bearing having a rotating portion on the rotating shaft, and a fixed portion, the rotating portion and the fixed portion being separated by bearing balls, and a suction provider, wherein the fixed portion of the ball bearing comprises at least one grease reservoir adjacent to the bearing balls for supplying the ball bearing with grease during rotational operation, the at least one grease reservoir being positioned on a first side of the ball bearing, the at least one grease reservoir being rechargeable from a lubrication system, the at least one grease reservoir further having a shape so that a point of the at least one grease reservoir being closest to the rotating shaft and a grease inlet of the ball bearing are adjoining, and wherein the suction provider is positioned on a second side of the ball bearing, said second side being opposite the said first side of the ball bearing, and wherein the method comprises:

rotating the rotating shaft, and creating a pressure which is lower than atmospheric pressure using the suction provider, so as to create a suction of grease through the ball bearing from the at least one grease reservoir, to thereby aid in distributing the grease in the ball bearing. Additionally, the method of lubrication according to the third aspect may also be considered as a method of repairing an electric machine bearing assembly as the skilled person will readily understand.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The wind turbine generator and the method according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
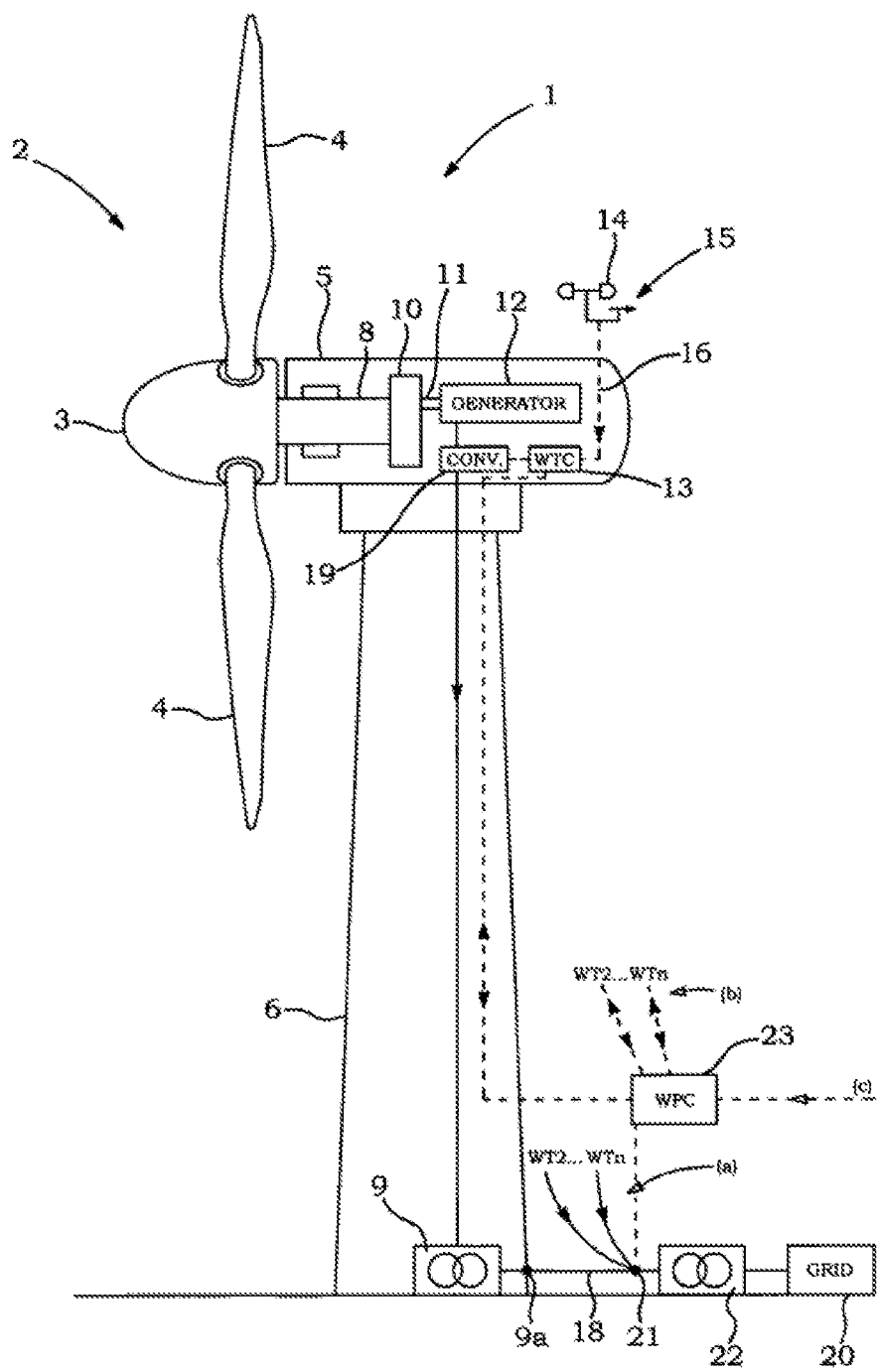
FIG. 1 is a schematic drawing of a wind turbine generator.

FIG. 1 shows, an exemplary variable-speed wind turbine generator 1. It has a rotor 3 with a hub to which, e.g., three rotor blades 4 are mounted. The pitch angle of the rotor blades 4 is variable by means of pitch actuators. The rotor 3 is supported by a nacelle 5 and drives a generator 12 via a main shaft 8, a gearbox 10, and a high-speed, rotating shaft 11. This structure is exemplary; other embodiments, for example, use a direct-drive generator without a gearbox. The generator 12 (e.g. Induction or synchronous generator) produces electrical output power of a frequency related to the rotation speed of the rotor 3, which is converted to grid frequency (e.g. about 50 or 60 Hz) by a converter 19. The voltage of the electric power thus produced is up-transformed by a transformer 9. The output of the transformer 9 is the wind turbine generator's terminals 9a. The electric power from the wind turbine generator 1 is fed into a grid 18 (symbolized by "a" in FIG. 1). A control system includes a wind turbine controller WTC 13. The wind turbine controller 13 controls operation of the individual wind turbine generator 1, e.g. selects the full-load or partial-load operation mode, depending i.a. on the current wind speed, causes, in the partial load mode, operation of the wind turbine generator at the optimal working point by adjusting the blade angle and controlling the tip speed ration to the aerodynamic optimum at the current wind speed, and controls the converter 19 to produce electricity according to prescriptions. The wind turbine controller 13 uses different input signals to perform its control tasks, for example signals representing current wind conditions (e.g. from an anemometer 14 and a wind vane 15), feed-back signals representing pitch angle, rotor position, amplitudes and phases of the voltage and current at the generator 12 and the terminals 9*a*, etc.

Figure 2:
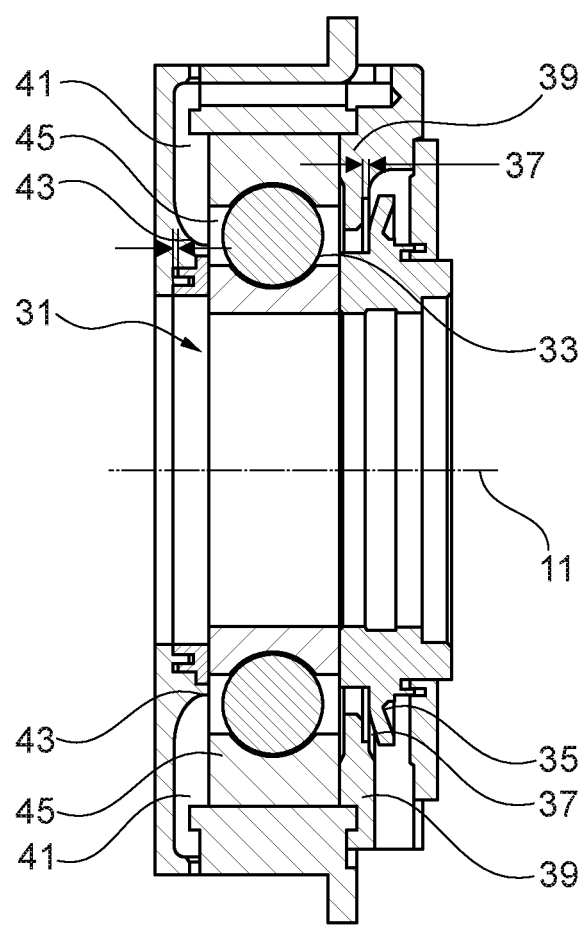
FIG. 2 is a cross-sectional illustration of a rotating shaft and a ball bearing supporting the rotating shaft.

FIG. 2 shows, in a cross-sectional view, a ball bearing 31 supporting a rotating shaft 11 in a wind turbine generator like in FIG. 1, the ball bearing 31 having a rotating portion on the rotating shaft, and a fixed portion, the rotating portion and the fixed portion being separated by bearing balls 33, and a suction provider 35. In the shown embodiment, the suction provider 35 is a rotating disc. The rotating disc forms a grease escape valve by having a narrow gap 37 with an opposing part 39 of the fixed portion of the ball bearing. Notice that the suction provider 35, i.e. the rotating disc, encircles the rotating shaft 11 so that the narrow gap 37 will also encircle the rotating shaft 11.

The fixed portion of the ball bearing 31 comprises at least one grease reservoir 41 adjacent to the bearing balls 33 for supplying the ball bearing 31 with grease during rotational operation. The grease reservoir 41 is positioned on a first side of the ball bearing, and is rechargeable by a connected pipe from a lubrication system (not shown here). The grease reservoir further has a shape so that a point 43 of the grease reservoir being closest to the rotating shaft 11 and a grease inlet of the ball bearing are adjoining.

The suction provider 35 is positioned on the other side of the ball bearing than the grease reservoir. Upon rotation of the rotating shaft, the rotating disc provides a pressure, which is lower than atmospheric pressure, so as to create a suction of grease through the ball bearing from the grease reservoir 41, which aids in distributing the grease in the ball bearing 31.

Figure 3:
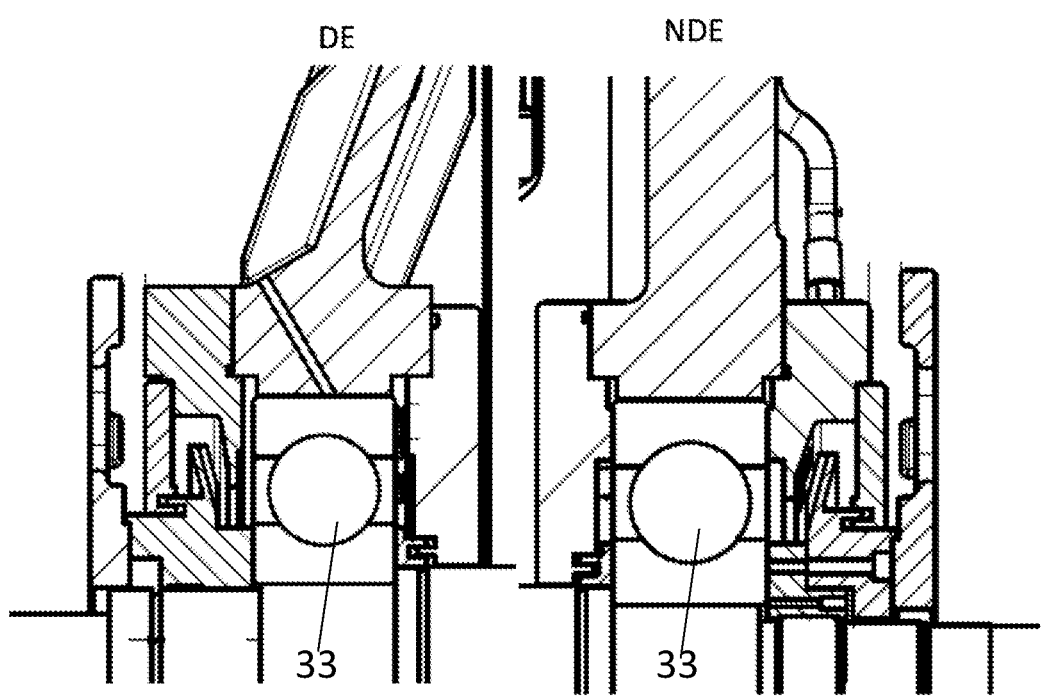
FIG. 3 is a cross-sectional illustration of two ball bearings located at the drive end and the non-drive end, respectively.

FIG. 3 shows a cross section of a ball bearing located at the drive end (DE) of a generator, and further a cross section of a ball bearing located at the non-drive end (NDE). The illustration thus resembles FIG. 2, but in a different view.

Figure 4:
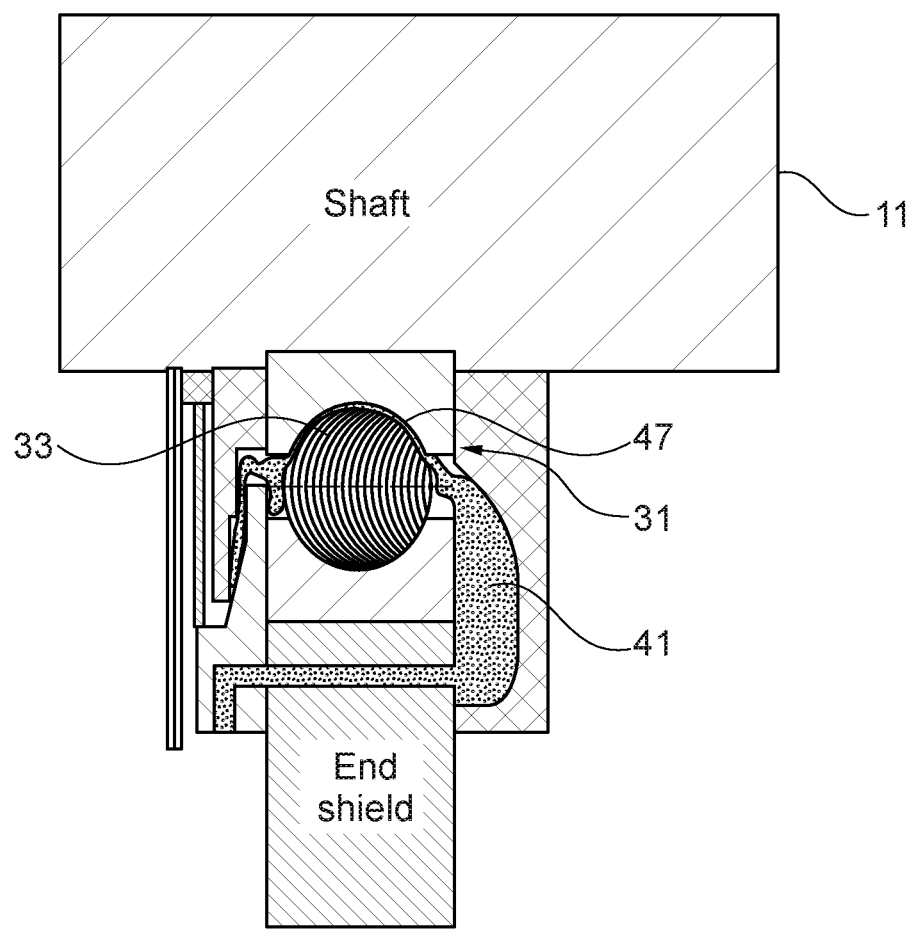
FIG. 4 is a concept illustration of a ball bearing supporting a rotating shaft with a grease reservoir.

FIG. 4 shows a ball bearing 31 supporting a rotating shaft 11. The fixed portion of the ball bearing 31 comprises at least one grease reservoir 41 adjacent to the bearing balls 33 for supplying the ball bearing 31 with grease 47 during rotational operation. The shape of the grease reservoir is designed to have a width, which is narrowing towards the grease inlet, so as to give, at least part of, the grease reservoir a substantially tapering shape. Also, at least part of the grease reservoir has a curved shape towards the grease inlet as seen in FIG. 4. The curved shape is further substantially aligned with a curvature of an inner race (being the upper race in this Figure) in the ball bearing 31 to facilitate improved distribution of grease.

Figure 5:
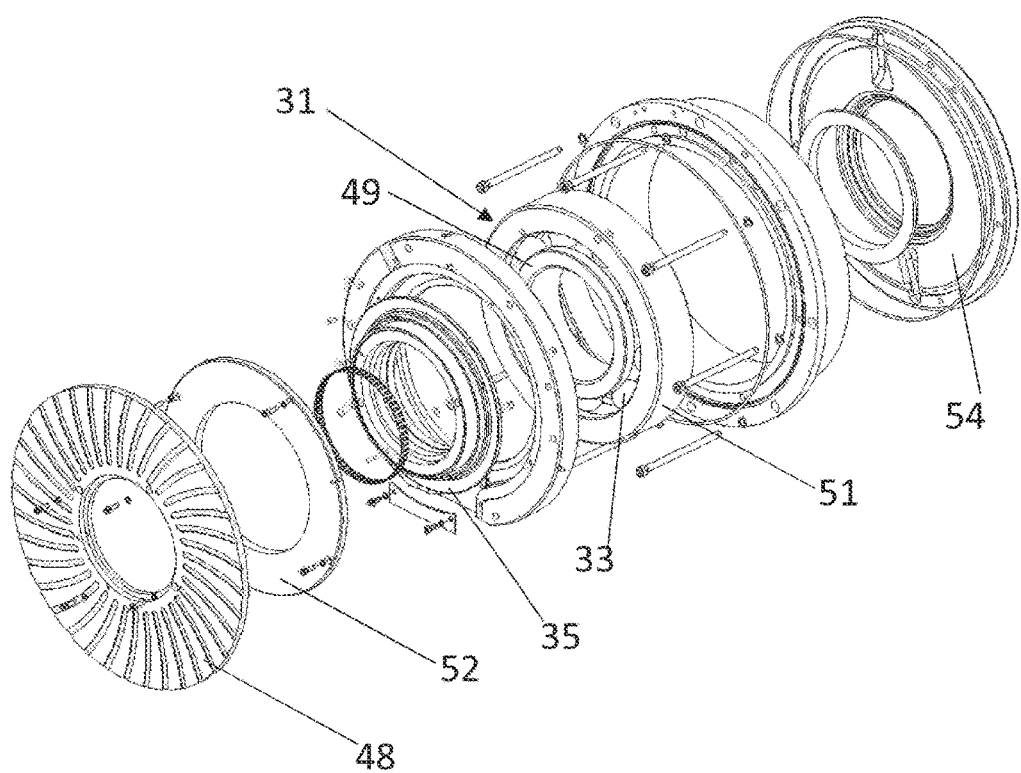
FIG. 5 is an exploded view of a ball bearing.

FIG. 5 shows an exploded view of an electric generator bearing assembly comprising a ball bearing 31, the ball bearing having a rotating portion 49 for supporting a rotating shaft (not shown), and a fixed portion 51. The rotating portion 49 and the fixed portion 51 are separated by bearing balls 33. The electric generator bearing assembly further comprises a bearing fan 48, a cap bearing cover 52, a suction provider 35 i.e. a rotating disc, and a bearing cover 54. In an advantageous embodiment, one or more of the shown components are made from a heat conductive material, such as aluminium or other suitable metals or alloys thereof.

Figure 6:
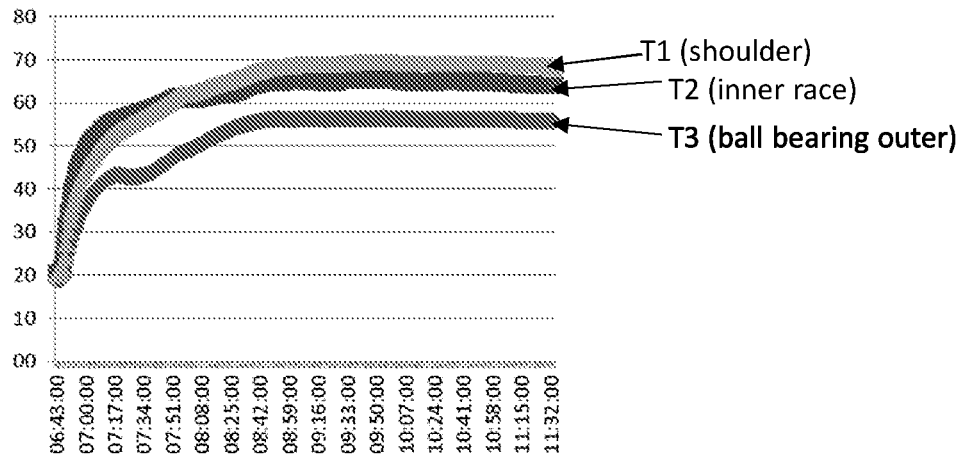
FIG. 6 shows two graphs illustrating temperature differences in a ball bearing.
Figure 6:
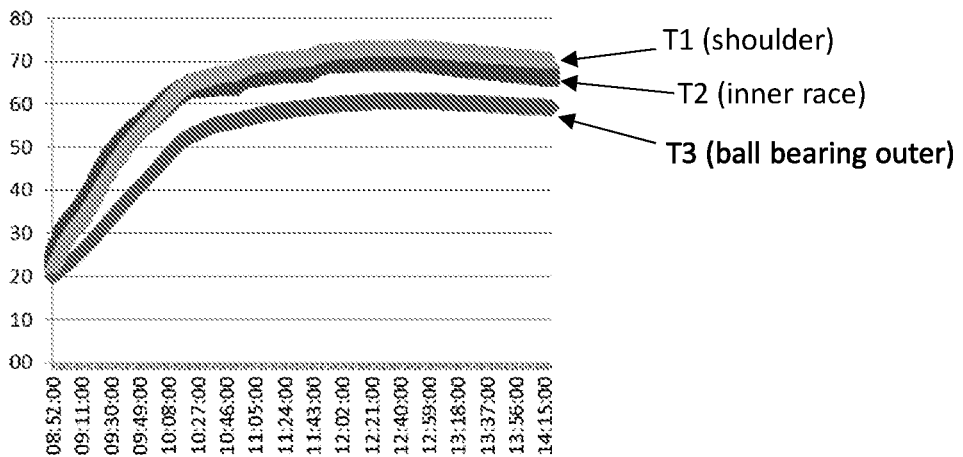
Figure 6:
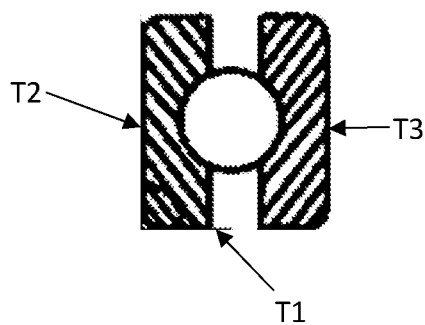

FIG. 6 shows two diagrams illustrating test results of temperature differences inside a ball bearing. The upper diagram shows results of a test performed on a traditional ball bearing 'Prior art', whereas the lower diagram shows results of a test performed on a generator bearing assembly according to the present invention 'New'. Three temperatures are measured and shown, T1 being the temperature obtained at a shoulder portion of the ball bearing, T2 being the temperature of the inner race of the ball bearing, and T3 being the temperature measured on the outside surface of the outer ring of the ball bearing as indicated in the schematic drawing below the two diagrams. In an ideal situation, the values of T1 and T2 should be as close to each other as possible, so that the graphs of T1 and T2, respectively, are overlapping. Furthermore, the distance to the graph of T3 should be small and constant.

In the wind turbine generator according to the present invention, the suction provider is configured to aid in distributing the grease in the ball bearing, so as to ensure that a temperature difference between an inner race of the ball bearing T2 and an outer race of the ball bearing T3 is as small as possible upon rotation of the rotating shaft.

It is visible in FIG. 6 that in the lower diagram, the graphs of T1 and T2 are more perfectly aligned than in the upper diagram showing a traditional ball bearing. Furthermore, it is evident that the temperature difference between T2 and T3 is approximately 10° C. in the upper diagram and approximately 5° C. in the lower diagram during stable operation. In the start-up phase, after e.g. approximately 50 minutes, the temperature difference is approximately 20° C. in the upper diagram and approximately 15° C. in the lower diagram showing the beneficial result of the present invention. Also, it should be mentioned that for some prior art ball bearings, the temperature difference was even more significant, e.g. in some situations a temperature difference of more than 40 degrees was observed, which certainly emphasises the advantages of the present invention.

Figure 7:
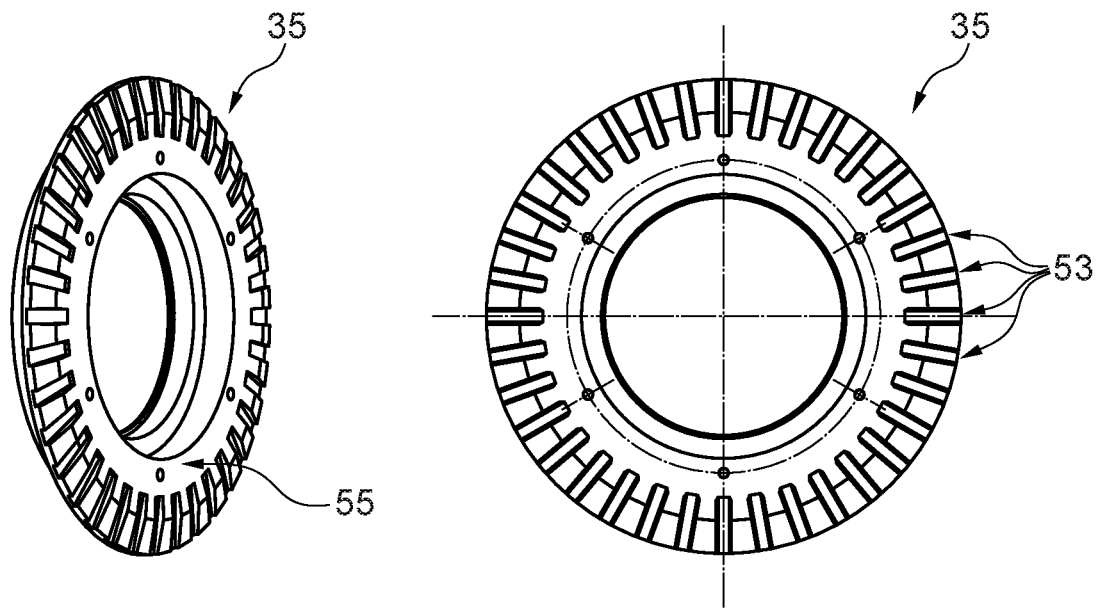
FIG. 7 is an embodiment of a rotating disc having guides on its surface, viewed in a perspective view and in a front view, respectively.

FIG. 7 shows a rotating disc being a suction provider 35 according to an embodiment of the present invention in a perspective view (left) and a front view (right). In the particular embodiment shown, the rotating disc has a plurality of guides 53, here indentations, on a front side 55 arranged to face the ball bearing. The guides are extending in a radial direction of the rotating disc to aid in distributing grease in the ball bearing upon rotation of the rotating shaft. In the shown embodiment, the indentations are shown as rectangular or trapezoidal shaped indentations/recesses into the material of the rotating disc. It has been realised by the inventors of the present invention that the indentations provide the advantage that the grease is distributed more evenly in the ball bearing.

Figure 8:
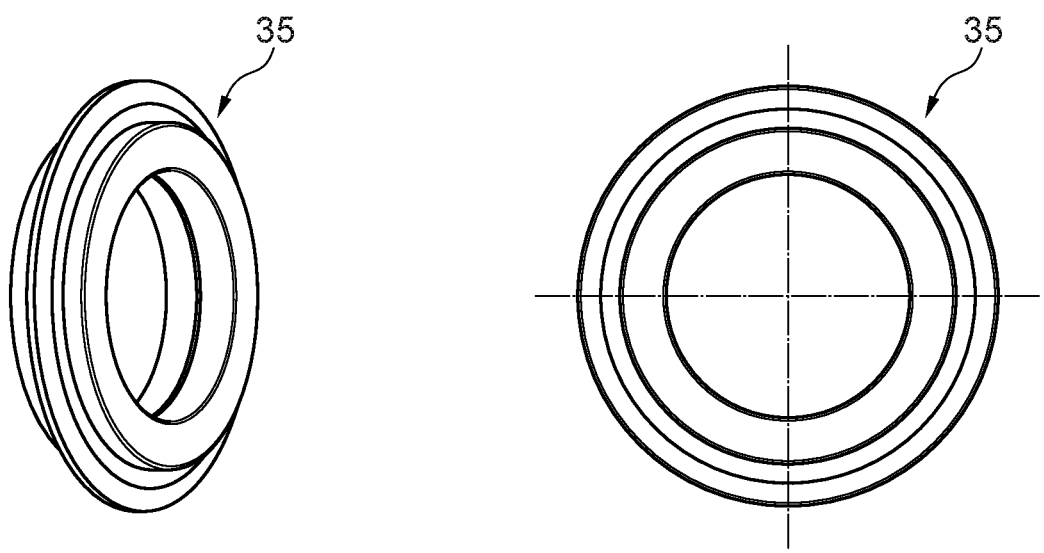
FIG. 8 is a further embodiment of a rotating disc viewed in a perspective view and in a front view, respectively.

FIG. 8 shows a rotating disc being a suction provider 35 according to an embodiment of the present invention in a perspective view (left) and a front view (right). The rotating disc is designed to form a grease escape valve by having a narrow gap with an opposing part of the fixed portion of the ball bearing. The rotating disc is configured to be positioned on the rotating shaft next to the ball bearing in the longitudinal direction of the rotating shaft, and since it is designed to extend from the ball bearing at an angle, the rotating disc will enable that the narrow gap has an angle of inclination into the ball bearing, relative to a longitudinal direction of the rotating shaft.

Figure 9:
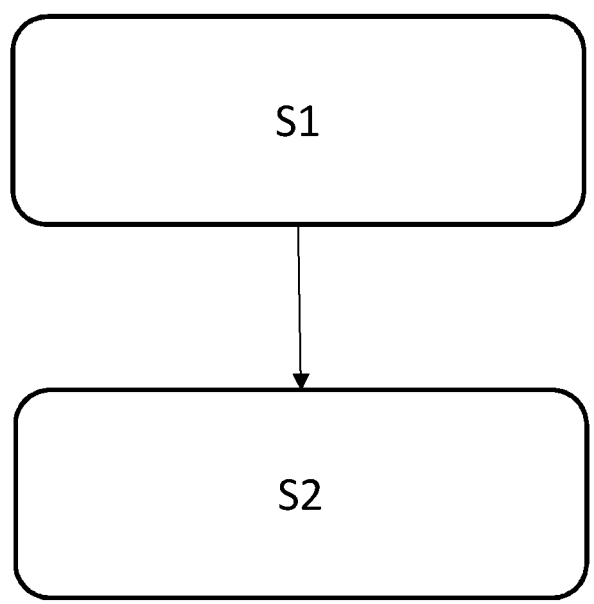
FIG. 9 is a flow-chart of a method according to the invention.

FIG. 9 shows a flow chart of a method according to an aspect of the present invention for providing grease lubrication of an electric machine bearing assembly, the electric machine bearing assembly comprising:

a ball bearing 31 supporting a rotating shaft, the ball bearing having a rotating portion on the rotating shaft, and a fixed portion, the rotating portion and the fixed portion being separated by bearing balls, and a suction provider 35, cf. FIG. 2, wherein the fixed portion of the ball bearing comprises at least one grease reservoir 41 adjacent to the bearing balls for supplying the ball bearing with grease during rotational operation, the at least one grease reservoir being positioned on a first side of the ball bearing, the at least one grease reservoir being rechargeable from a lubrication system, the at least one grease reservoir further having a shape so that a point 43 of the at least one grease reservoir being closest to the rotating shaft and a grease inlet of the ball bearing are adjoining, cf. FIG. 4, and wherein the suction provider is positioned on a second side of the ball bearing, said second side being opposite the said first side of the ball bearing, and wherein the method comprises, simultaneously (wholly or partly) or consecutively the steps of:

S1 rotating the rotating shaft, and

S2 creating a pressure which is lower than atmospheric pressure using the suction provider, so as to create a suction of grease 47 through the ball bearing from the at least one grease reservoir, to thereby aid in distributing the grease in the ball bearing, cf. FIG. 4.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A wind turbine generator comprising an electric generator and a rotating shaft transmitting rotational movement to the electric generator, the electrical generator comprising an electric generator bearing assembly being grease lubricated, the electric generator bearing assembly comprising:
a ball bearing supporting the rotating shaft, the ball bearing having a rotating portion on the rotating shaft, and a fixed portion, the rotating portion and the fixed portion being separated by bearing balls, and
a suction provider,
wherein the fixed portion of the ball bearing comprises at least one grease reservoir adjacent to the bearing balls for supplying the ball bearing with grease during rotational operation, the at least one grease reservoir being positioned on a first side of the ball bearing and being isolated from the rotating shaft such that no portion of the rotating shaft extends through the at least one grease reservoir, the at least one grease reservoir being rechargeable from a lubrication system,
the at least one grease reservoir further having a shape so that a point of the at least one grease reservoir being closest to the rotating shaft and a grease inlet of the ball bearing are adjoining, and
wherein the suction provider is positioned on a second side of the ball bearing, said second side being opposite the said first side of the ball bearing, and
wherein the suction provider, during rotation of the rotating shaft, creates a pressure which is lower than atmospheric pressure, so as to create a suction of grease through the ball bearing from the at least one grease reservoir, which aids in distributing the grease in the ball bearing.

2. The wind turbine generator according to claim 1, wherein the shape of the at least one grease reservoir is designed to have a width, which is narrowing towards the grease inlet, so as to give, at least part of, the grease reservoir a substantially tapering shape.

3. The wind turbine generator according to claim 1, wherein, at least part of, the grease reservoir has a curved shape towards the grease inlet, the curved shape being substantially aligned with a curvature of an inner race in the ball bearing.

4. The wind turbine generator according to claim 1, wherein the suction provider is configured to aid in distributing the grease in the ball bearing, so as to ensure that a temperature difference between an inner race of the ball bearing and an outer race of the ball bearing is less than approximately 20° C.

5. The wind turbine generator according to claim 1, wherein the suction provider, upon rotation of the rotating shaft, creates a pressure approximately 0.03-0.3 bar lower than atmospheric pressure.

6. The wind turbine generator according to claim 1, wherein the suction provider by the lower pressure aids in distributing grease evenly in an inner race of the ball bearing, so as to prevent grease from building up at one or more points in the inner race.

7. The wind turbine generator according to claim 1, wherein the suction provider is a rotating disc, the rotating disc forming a grease escape valve by having a narrow gap with an opposing part of the fixed portion of the ball bearing, and wherein the rotating disc, upon rotation of the rotating shaft, provides the pressure which is lower than atmospheric pressure.

8. The wind turbine generator according to claim 7, wherein the narrow gap has an angle of inclination into the ball bearing, relative to a longitudinal direction of the rotating shaft, being between orthogonal and parallel.

9. The wind turbine generator according to claim 7, wherein the angle of inclination of the narrow gap with respect to a direction orthogonal to the longitudinal direction of the rotating shaft is approximately 5-30 degrees.

10. The wind turbine generator according to claim 7, wherein the rotating disc has a plurality of guides on a front side arranged to face the ball bearing, said guides extending in a radial direction of the rotating disc, so as to aid in distributing grease in the ball bearing upon rotation of the rotating shaft.

11. The wind turbine generator according to claim 7, wherein the narrow gap, defined by the rotating disc and the opposing part of said fixed portion, has a length which is substantially equal to, or larger than, half the diameter of the balls in the bearing.

12. The wind turbine generator according to claim 1, wherein the suction provider is a pump, said pump being arranged to create a suction of grease during rotation of the rotating shaft.

13. The wind turbine generator according to claim 1, wherein the first side of the ball bearing communicates with the second side of the ball bearing only through the ball bearing.

14. The wind turbine generator according to claim 7, wherein the narrow gap of the grease escape valve encircles the rotating shaft.

15. An electric machine assembly comprising an electric machine and a rotating shaft transmitting rotational movement to, or from, the electric machine, the electrical machine comprising an electric machine bearing assembly being grease lubricated, the electric machine bearing assembly comprising:
- a ball bearing supporting the rotating shaft, the ball bearing having a rotating portion on the rotating shaft, and a fixed portion, the rotating portion and the fixed portion being separated by bearing balls, and
- a suction provider,
- wherein the fixed portion of the ball bearing comprises at least one grease reservoir adjacent to the bearing balls for supplying the ball bearing with grease during rotational operation, the at least one grease reservoir being positioned on a first side of the ball bearing and being isolated from the rotating shaft such that no portion of the rotating shaft extends through the at least one grease reservoir, the at least one grease reservoir being rechargeable from a lubrication system,
- the at least one grease reservoir further having a shape so that a point of the at least one grease reservoir being closest to the rotating shaft and a grease inlet of the ball bearing are adjoining, and
- wherein the suction provider is positioned on a second side of the ball bearing, said second side being opposite the said first side of the ball bearing, and
- wherein the suction provider, during rotation of the rotating shaft, creates a pressure which is lower than atmospheric pressure, so as to create a suction of grease through the ball bearing from the at least one grease reservoir, which aids in distributing the grease in the ball bearing.

16. A method of providing grease lubrication of an electric machine bearing assembly, the electric machine bearing assembly comprising:
- a ball bearing supporting a rotating shaft, the ball bearing having a rotating portion on the rotating shaft, and a fixed portion, the rotating portion and the fixed portion being separated by bearing balls, and
- a suction provider,
- wherein the fixed portion of the ball bearing comprises at least one grease reservoir adjacent to the bearing balls for supplying the ball bearing with grease during rotational operation, the at least one grease reservoir being positioned on a first side of the ball bearing and being isolated from the rotating shaft such that no portion of the rotating shaft extends through the at least one grease reservoir, the at least one grease reservoir being rechargeable from a lubrication system,
- the at least one grease reservoir further having a shape so that a point of the at least one grease reservoir being closest to the rotating shaft and a grease inlet of the ball bearing are adjoining, and
- wherein the suction provider is positioned on a second side of the ball bearing, said second side being opposite the said first side of the ball bearing, and
- wherein the method comprises:
- rotating the rotating shaft, and
- creating a pressure which is lower than atmospheric pressure using the suction provider, so as to create a suction of grease through the ball bearing from the at least one grease reservoir, to thereby aid in distributing the grease in the ball bearing.

* * * * *